United States Patent
L'Hermite et al.

(10) Patent No.: US 6,469,484 B2
(45) Date of Patent: Oct. 22, 2002

(54) POWER SUPPLY CIRCUIT AND METHOD THEREOF TO DETECT DEMAGNITIZATION OF THE POWER SUPPLY

(75) Inventors: Francois L'Hermite, Lasserre; Christophe Basso, Pibrac, both of (FR)

(73) Assignee: Semiconductor Components Industries LLC, Phoenix, AZ (US)

(*) Notice: Subject to any disclaimer, the term of this patent is extended or adjusted under 35 U.S.C. 154(b) by 0 days.

(21) Appl. No.: 09/785,751

(22) Filed: Feb. 20, 2001

(65) Prior Publication Data

US 2002/0070720 A1 Jun. 13, 2002

(30) Foreign Application Priority Data

Dec. 13, 2000 (EP) .............................. 00403508

(51) Int. Cl.[7] ................................. G05F 1/44
(52) U.S. Cl. ......................... 323/284; 363/97
(58) Field of Search ................. 363/20, 21.01, 363/21.8, 95, 93, 131; 323/282, 284

(56) References Cited

U.S. PATENT DOCUMENTS

| | | | | |
|---|---|---|---|---|
| 5,638,260 A | * | 6/1997 | Bees ........................... | 363/17 |
| 5,729,443 A | | 3/1998 | Pavlin | |
| 6,049,471 A | * | 4/2000 | Korcharz et al. .............. | 363/20 |
| 6,088,243 A | * | 7/2000 | Shin ............................. | 363/21 |
| 6,104,622 A | * | 8/2000 | Shin ............................. | 363/21 |

FOREIGN PATENT DOCUMENTS

DE  19643136  4/1997  ............ H02M/3/28

* cited by examiner

*Primary Examiner*—Adolf Deneke Berhane

(57) ABSTRACT

A regulator circuit (26) operates a switching power supply (10) in discontinuous conduction mode (DCM) by detecting the state of demagnetization of a transformer (16) of the switching power supply. When a primary current ($I_p$) reaches zero the voltage across a drain and a source of a switching transistor (18) drops off sharply generating a negative spike in voltage at gate voltage $V_G$. The negative spike in voltage indicates the transformer of the switching power supply is demagnetized. The negative spike is detected by a comparator (44). The comparator provides a signal (DEMAG) to a PWM regulator (46) which provides a first control signal ($L_c$) to a first transistor (40), and a second control signal ($U_c$) to a second transistor (42). The first and second transistors turn ON and OFF to enable ON the switching transistor only after the transformer (16) is demagnetized to enable the switching power supply to operate in DCM.

14 Claims, 4 Drawing Sheets

POWER SUPPLY CIRCUIT AND METHOD THEREOF TO DETECT DEMAGNETIZATION OF THE POWER SUPPLY

BACKGROUND OF THE INVENTION

The present invention relates in general to electronic devices and, more particularly, to switching regulators used in power supplies.

Most switching power supplies have a transformer with a power switching transistor coupled to one side of the transformers primary winding. The power transistor turns on and off as determined by a regulator circuit to alternately store energy in the magnetic field of the transformer and transfer the stored energy to the secondary winding. The secondary winding of the transformer develops a DC output voltage across a shunt capacitor coupled across the secondary winding as a function of the energy transfer.

One type of switching power supply, a flyback power supply, can be operated in a continuous conduction mode (CCM) or discontinuous conduction mode (DCM). DCM involves switching the power switching transistor to reenergize the primary winding only after it is completely demagnetized, whereas CCM involves switching the power switching transistor even though the primary winding is still magnetized. It is preferable to operate a flyback power supply in DCM because CCM is more difficult to stabilize and turn-on losses can be significantly higher.

To operate a flyback power supply in DCM it is necessary to detect when the transformer core of the primary winding is demagnetized. At a point in time $t_O$, the transformer core is demagnetized, which corresponds to the point when the primary current $I_P$ reaches zero. By indirectly measuring a voltage across an auxiliary winding of the flyback power supply the point when the primary current $I_P$ reaches zero can be determined. However, the auxiliary winding represents an additional element that increases manufacturing cost. Elimination of the auxiliary winding used to detect demagnetization is beneficial to reduce manufacturing cost of switching power supplies.

Accordingly, a flyback power supply that detects when the transformer core of the primary winding is demagnetized without using an auxiliary winding is needed in the art. The invention disclosed herein will address the above problems.

DETAILED DESCRIPTION OF THE DRAWINGS

Figure 1:
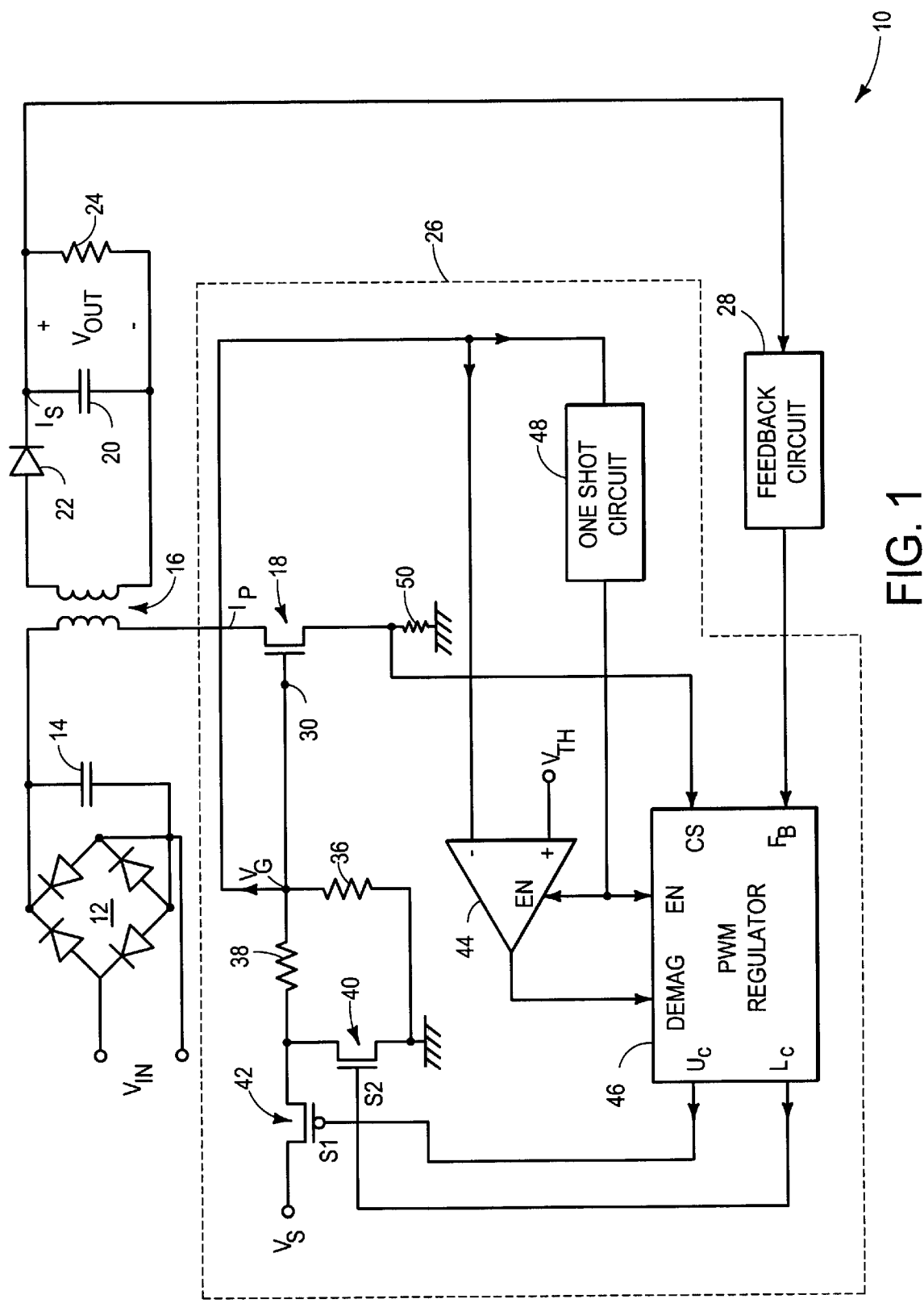
FIG. 1 is a schematic diagram of a flyback power supply circuit including a regulator circuit which monitors a gate voltage of a switching transistor.

FIG. 1 illustrates an embodiment of switching power supply 10. Specifically, switching power supply 10 receives an AC line voltage at $V_{IN}$ and converts it to a regulated DC operating voltage. An AC line voltage is converted to a DC bulk voltage by full-wave rectifier diode bridge 12. Capacitor 14 filters the DC bulk voltage, and the primary winding of transformer 16 receives the DC bulk voltage. Power transistor 18 conducts an inductor current through the primary winding of transformer 16 to control the amount of energy stored in the magnetic field of transformer 16. When power transistor 18 is non-conductive, the energy stored in the magnetic field is transferred to the secondary winding where capacitor 20 and resistor 24 is coupled across the secondary winding to develop DC output voltage $V_{OUT}$. Diode 22 prevents current flow back into the secondary winding.

Regulator circuit 26 provides a constant regulated output voltage $V_{OUT}$, to switching power supply 10 using feedback information from the secondary winding at resistor 24. The feedback information is fed-back to feedback circuit 28 which is then fed to regulator circuit 26 to turn ON and OFF power transistor 18 to control the power transfer across transformer 16. Thus, power transistor 18 is a switching transistor. Regulator circuit 26 includes power transistor 18, which is typically a Metal Oxide Semiconductor Field Effect Transistor (MOSFET) or an Insulated Gate Bipolar Transistor (IGBT). PWM regulator 46 controls transistor 40 and transistor 42 to ensure power transistor 18 controls switching power supply 10 to operate in DCM. To operate in DCM, transistor 40 and transistor 42 are switched to ensure power transistor 18 is enabled ON only after transformer 16 is demagnetized.

Power transistor 18 has a drain, source, and gate. The gate, gate 30, of power transistor 18 is monitored to detect when transformer 16 is demagnetized. Connected to gate 30 is resistor 36 and resistor 38. Resistor 36 is connected between gate 30 and ground and resistor 38 is connected between gate 30 and to the drain of transistor 40. Resistor 36 has a higher resistance than the resistance of resistor 38. Thus, the path from gate 30 to ground through resistor 38 is a low-impedance path, whereas the path from ground through resistor 36 is a high-impedance path. Transistor 40 is an n-type transistor having its drain coupled to resistor 38 and its source coupled to ground potential. The gate of transistor 40 is coupled to receive control signal $L_C$ from PWM regulator 46. Transistor 42 has its source connected to the drain of transistor 40, a voltage source $V_S$ connected to its drain, and the gate coupled to receive control signal $U_C$ from PWM regulator 46. Transistor 42 is a p-type transistor. Transistor 40 and transistor 42 are typically MOSFET transistors connected in a totem-pole configuration to drive power transistor 18. Voltage source $V_S$ is a low-impedance voltage source providing a reference voltage to the drain of transistor 42 of approximately 0 or 10 volts.

Gate voltage $V_G$ of power transistor 18 is monitored to detect a spike in voltage generated by the parasitic effects of power transistor 18. The spike in gate voltage $V_G$ represents when transformer 16 is demagnetized. To operate switching power supply 10 in DCM operation requires to detect when transformer 16 is demagnetized. The voltage at gate voltage $V_G$ is fed to the negative terminal of comparator 44 to monitor for a spike in gate voltage. Gate voltage $V_G$ is compared with voltage threshold $V_{TH}$ at the positive terminal of comparator 44. Gate voltage $V_G$ is a detect signal to detect demagnetization in switching power supply 10. A typical value for voltage threshold $V_{TH}$ is −0.2 volts. Comparator 44 provides an output when the feedback signal to the negative terminal exceeds the voltage threshold set on the positive terminal. Thus, when a voltage spike at gate 30 exceeds voltage threshold $V_{TH}$, comparator 44 provides a demagnetization (DEMAG) signal to PWM regulator 46.

PWM regulator 46 further receives feedback signal $F_B$ from feedback circuit 28. Feedback circuit 28 is a typical feedback circuit used in the prior art for switching power supplies. An example of feedback circuit 28 is an optical coupler circuit using a light emitting diode and photo-detection transistor. Feedback circuit 28 is connected to the output of switching power supply 10 at resistor 24 and provides feedback signal $F_B$ to PWM regulator 46. PWM regulator 46 receives feedback signal $F_B$ and the DEMAG signal, and provides control signals $L_C$ and $U_C$ to transistor 40 and transistor 42. When a voltage spike is detected in gate voltage $V_G$, comparator 44 provides DEMAG signal to PWM regulator 46. PWM regulator 46 receives DEMAG signal and provides control signals $L_C$ and $U_C$ to transistor 40 and transistor 42 respectively to turn ON power transistor 18 to operate in DCM mode by switching transistor 40 and transistor 42 ON and OFF at appropriate times during a cycle. Feedback signal $F_B$ from feedback circuit 28 provides output voltage variation information to PWM regulator 46 to regulate output voltage $V_{OUT}$.

One shot circuit 48 is connected to the node at gate voltage $V_G$. One shot circuit 48 provides an enable (EN) signal to comparator 44 to enable comparator 44 after time delay $t_d$ to avoid false detection of demagnetization. One shot circuit 48 disables comparator 44 after a time duration of typically 2 microseconds. False triggering of detection in comparator 44 may be caused by the primary to secondary leakage inductance of transformer 16 which shows up as an overshoot in $V_{DS}$ to power transistor 18. The EN signal from one shot circuit 48 further provides information to PWM regulator 46 and to control signal $L_C$ which controls transistor 40. Resistor 50 is connected to the source of power transistor 18 to monitor the source current in power transistor 18 and provide current sense CS to PWM regulator 46.

Figure 2:
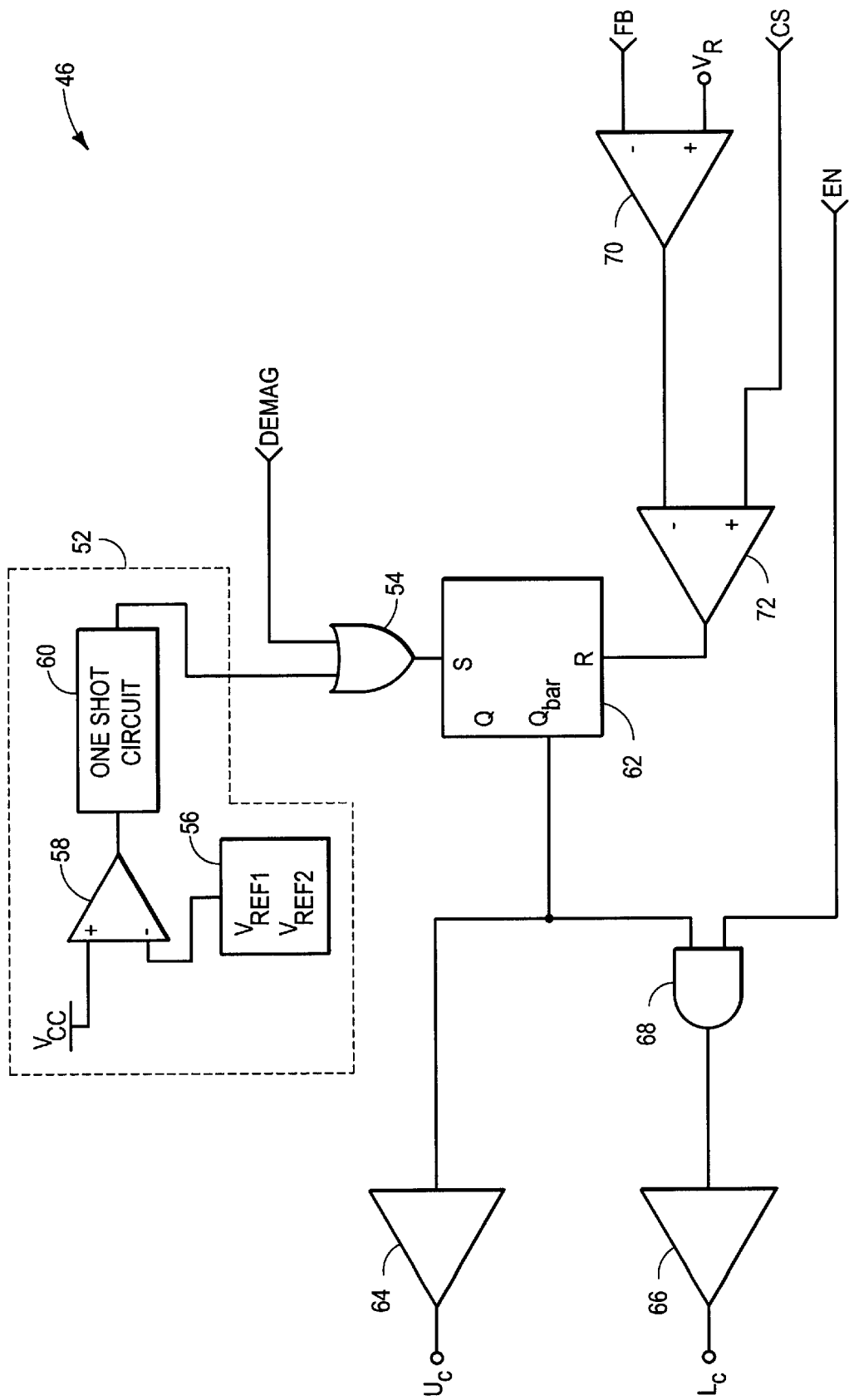
FIG. 2 is a schematic diagram of the regulator circuit.

FIG. 2 illustrates PWM regulator 46 of FIG. 1. When the power supply to regulator circuit 26 is first applied, PWM regulator 46 is off. PWM controller 52 connected to gate 54 monitors the power supply of regulator circuit 26.

Comparator 58 receives power supply $V_{CC}$ at the positive terminal and reference voltage 56 at the negative terminal. When $V_{CC}$ is approximately at $V_{REF1}$ of reference voltage 56 one shot circuit 60 provides a pulse of typically 2 microseconds to gate 54. Gate 54 provides a high output to the "set" (S) pin of latch 62. When $V_{CC}$ drops down to $V_{REF2}$ of reference voltage 56 one shot circuit 60 output goes low causing a low output to gate 54 and "set" pin of latch 62. The signal DEMAG to gate 54 is low during this time. $V_{REF1}$ is typically 12 volts and $V_{REF2}$ is typically 8 volt.

Latch 62 provides a Q bar output to buffer 64 and to the input of gate 68. Buffer 64 provides control signal $U_C$ as an output. Gate 68 further has enable signal EN as an input and provides an output to buffer 66 to provide the control signal $L_C$. Comparator 70 receives feedback signal $F_B$ at the negative terminal and a voltage reference $V_R$ at the positive terminal. A typical value for $V_R$ is 2.5 volts. The output of comparator 70 is fed to the negative terminal of comparator 72 and current sense CS is fed to the positive terminal. The output of comparator 72 is fed to the "reset" (R) terminal of latch 62.

Figure 3:
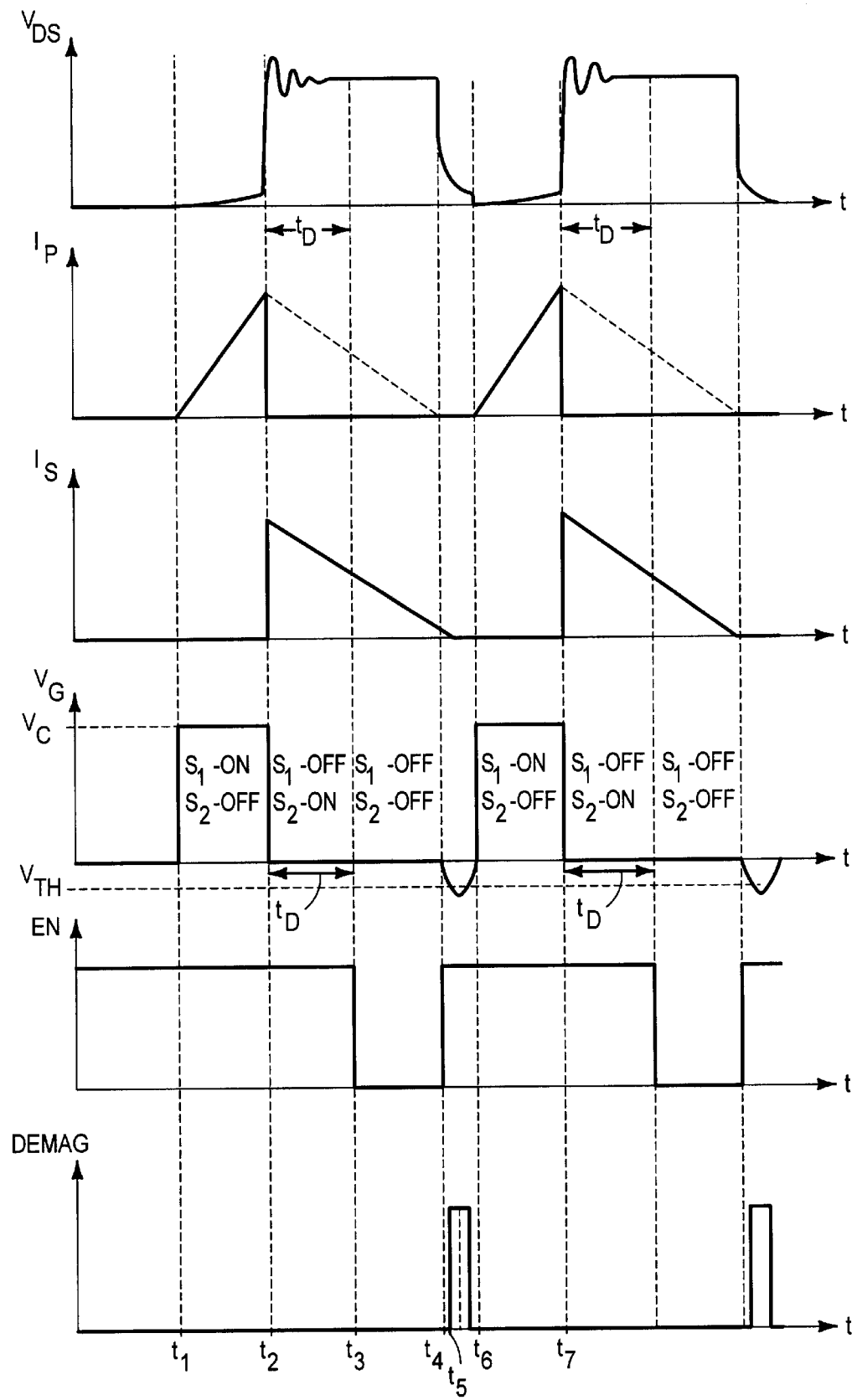
FIG. 3 is a series of timing diagrams illustrating the regulator circuit operation.

FIG. 3 illustrates the timing diagram of the operation of regulator circuit 26. Refer to FIG. 2 for operation of PWM regulator 46 based on timing diagrams in FIG. 3. At power up prior to time $t_1$, the power supply voltage $V_{CC}$ increases up to $V_{REF1}$. When $V_{CC}$ exceeds $V_{REF1}$, one shot circuit 60 enables a logic high output which provides a logic high output signal from gate 54. DEMAG signal is a second input to gate 54 which is logic low at this point. The output from gate 54 is coupled to the "set" pin of latch 62 which enables Q bar to go logic low. A logic low signal at Q bar enables control signal $U_C$ through buffer 64 to go logic low. A logic low at control signal $U_C$ enables transistor 42 to switch ON. The Q bar output from latch 62 is also fed to a first input of gate 68. A second input to gate 68 receives a logic high signal from enable signal EN. The two inputs to gate 68 enables a logic low control signal $L_C$ through buffer 66 to transistor 40. The logic low control signal $L_C$ enables transistor 40 to switch OFF. Gate 30, gate voltage $V_G$, of power transistor 18 is enabled logic high since transistor 42 (S1) is switched ON and transistor 40 (S2) switched OFF. The gate voltage $V_G$ is enabled logic high up to a constant voltage $V_C$ at time $t_1$, as shown in FIG. 3. A typical value for $V_C$ is 10 volts. After time $t_1$, the primary current I. of transformer 16 increases as shown in FIG. 3 up to time $t_2$. Power transistor 18 is switched ON as the primary current $I_P$ reaches its maximum current at $t_2$. The primary current $I_P$ flows through the primary windings of transformer 16 to generate a secondary current $I_S$ in switching power supply 10 as shown in FIG. 3. The flow of secondary current $I_S$ provides output voltage $V_{OUT}$ which is fed back to feedback circuit 28. Feedback circuit 28 provides a feedback signal $F_B$ to PWM regulator 46. Feedback signal $F_B$ is fed to the negative terminal of comparator 70 of PWM regulator 46 which is compared to a voltage reference $V_R$ at the positive terminal. Comparator 70 provides an output signal to the negative terminal of comparator 72 when feedback signal $F_B$ exceeds voltage reference $V_R$. The positive terminal of comparator 72 receives current sense CS. Current sense CS is created from the current flowing through resistor 50 of power transistor 18. Current sense CS increases as power transistor 18 is switched ON. Current sense CS along with the output from comparator 70 fed to comparator 72 enables a logic high to the "reset" pin of latch 62. The reset signal enables Q bar output of latch 62 logic high. A logic high Q bar output from latch 62 enables a logic high to control signal $U_C$ which switches transistor 42 OFF. Thus, transistor 42 is switched OFF at time $t_2$. Further, the logic high Q bar output is fed to one terminal of gate 68. The second terminal receives enable signal EN. Enable signal EN remains logic high at time $t_2$. Thus, the output to gate 68 is enabled logic high, which in turn enables a logic high control signal $L_C$ to switch transistor 40 ON. Thus, at time t2 transistor 42 (S1) is switched OFF and transistor 40 (S2) is switched ON as shown in FIG. 3. Further, at time t2, one shot circuit 48 detects the voltage overshoot in $V_{DS}$ of power transistor 18 and starts a timer of duration time delay $t_D$.

The time $t_3$ is defined as the point in time when time delay $t_D$ is reached as shown in FIG. 3. One shot circuit 48 provides a logic low output to enable signal EN input of PWM regulator 46 after time delay $t_D$ has elapsed. Time delay $t_D$ is determined to ensure comparator 44 is enabled OFF and turns ON only after time delay $t_D$ has elapsed to prevent comparator 44 from reacting to spurious signals in $V_{DS}$ as shown in FIG. 3. Enable signal EN provides a logic low at gate 68 after time delay $t_D$ has expired which enables control signal $L_C$ logic low. A logic low to control signal $L_C$ enables transistor 40 to switch OFF. Control signal $U_C$ is still logic high at time $t_3$. Thus, at time $t_3$ transistor 42 (S1) remains switched OFF and transistor 40 (S2) is switched OFF as shown in FIG. 3. Further, comparator 44 turns ON at time $t_3$ from one shot circuit 48's enable signal EN output. FIG. 3 illustrates enable signal EN switches logic low. Thus, as illustrated comparator 44 is enabled ON by the logic low enable signal EN.

Just past time $t_4$ in FIG. 3, the increase in negative gate voltage $V_G$ is fed to the negative terminal of comparator 44. Gate voltage $V_G$ is fed to the negative terminal and compared to the voltage threshold $V_{TH}$ at the positive terminal. Just prior to time $t_5$, gate voltage $V_G$ exceeds voltage threshold $V_{TH}$ which enables comparator 44 to output DEMAG signal to PWM regulator 46. At time t5, DEMAG signal is enabled high as shown in FIG. 3. The enable of DEMAG signal to PWM regulator 46 indicates the point when the primary current $I_P$ reduces to zero, and more importantly, the point where transformer 16 of switching power supply 10 is demagnetized. The logic high DEMAG signal is fed to the input to gate 54 which provides a "set" signal to latch 62 which enables Q bar to go logic low. A logic low signal at Q bar enables control signal $U_C$ through buffer 64 to go logic low. A logic low at control signal $U_C$ enables transistor 42 to switch ON. The Q bar output from latch 62 is also fed to a first input of gate 68. Do note, enable signal EN is switched logic high at time $t_4$ since one shot circuit 48 only provides a logic low output for a specified time frame. A typical time frame for the one shot circuit is 2 microseconds. Thus, the specified time frame expired at time $t_4$ and switched enable signal EN logic high. The logic low Q bar output signal from latch 62 to gate 68 enables a logic low control signal $L_C$ through buffer 66 to transistor 40. The logic low control signal $L_C$ maintains transistor 40 in the OFF state. Power transistor 18 is again enabled logic high since transistor 42 (S1) is switched ON and transistor 40 (S2) is switched OFF.

Thus, at time $t_4$ transistor 42 (S1) and transistor 40 (S2) are enabled OFF and comparator 44 is enabled ON to detect the voltage spike in gate voltage $V_G$. Gate voltage $V_G$ is detected and comparator 44 provides enable signal EN when the voltage spike exceeds voltage threshold $V_{TH}$. The voltage spike indicates that transformer 16 has been demagnetized, and enables gate voltage $V_G$ to go logic high at time $t_6$. The enablement of gate voltage $V_G$ at time $t_6$ enables ON power transistor 18 at time $t_7$ after primary current $I_P$ has increased. The enablement of power transistor 18 at time $t_7$ by the increase in gate voltage $V_G$ at time $t_6$ ensures that power transistor 18 only turns ON after transformer 16 has been demagnetized. Turning ON power transistor 18 only after transformer 16 has been demagnetized ensures switching power supply 10 operates in DCM. Once transformer 16 is detected as being demagnetized, power transistor 18 is enabled ON from gate voltage $V_G$ enabling logic high at time $t_6$, and the timing sequence is repeated. The timing sequence of FIG. 3 repeats the same cycle at time $t_6$ as was completed from time $t_1$, up to time $t_5$. FIG. 3 illustrates the repeating cycle in the timing diagram starting again at time $t_6$.

Figure 4:
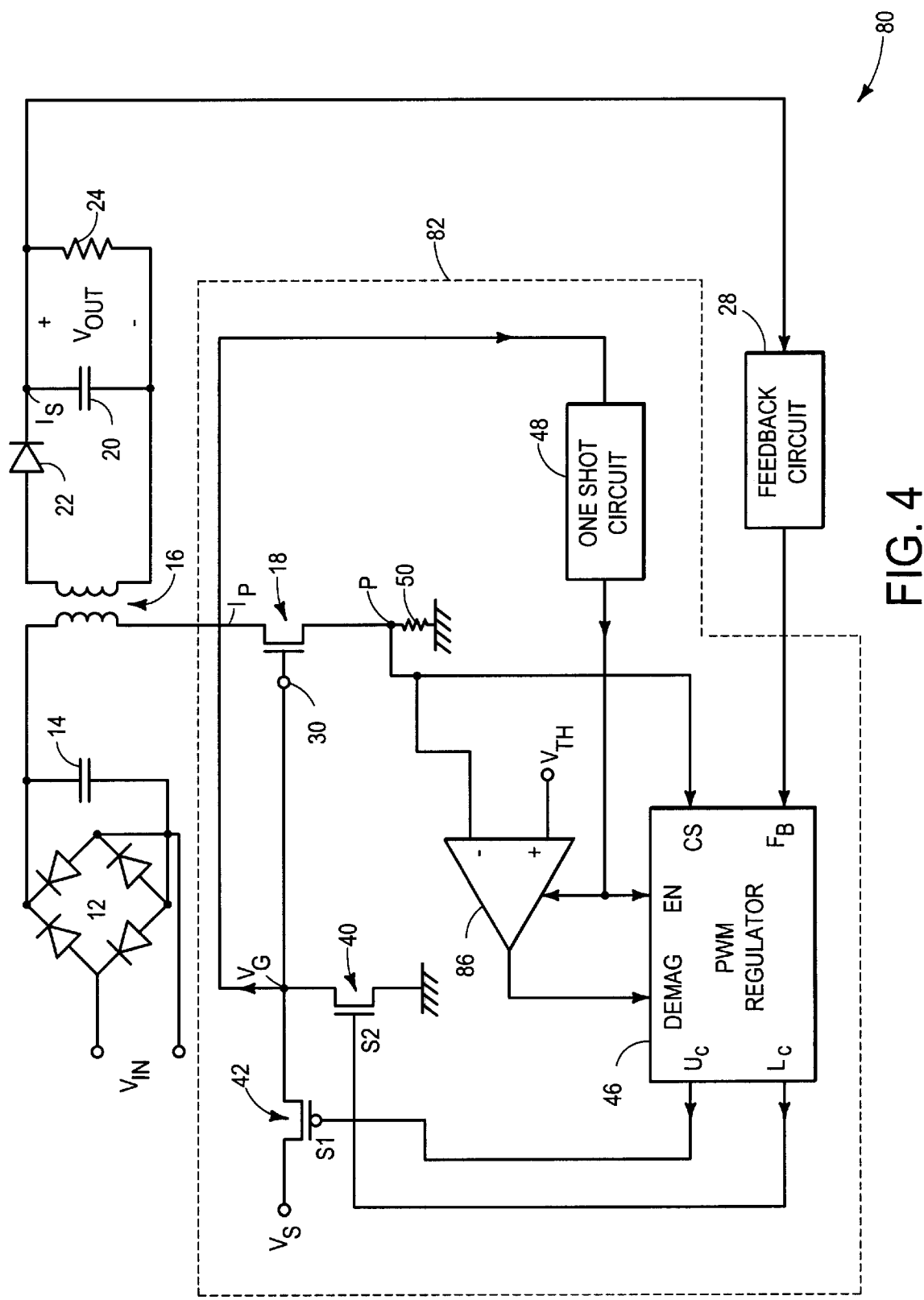
FIG. 4 is a schematic diagram of the flyback power supply circuit including the regulator circuit which monitors current through the switching transistor.

FIG. 4 illustrates switching power supply 80 as an alternative embodiment of switching power supply 10 shown in FIG. 1. The same figure designations for similar items in FIG. 1 are used to illustrate the items in FIG. 4.

Switching power supply 80 receives an AC line voltage at $V_{IN}$ and converts it to a regulated DC operating voltage. An AC line voltage is converted to a DC bulk voltage by full-wave rectifier diode bridge 12. Capacitor 14 filters the DC bulk voltage, and the primary winding of transformer 16 receives the DC bulk voltage. Power transistor 18 conducts an inductor current through the primary winding of transformer 16 to control the amount of energy stored in the magnetic field of transformer 16. When power transistor 18 is nonconductive, the energy stored in the magnetic field is transferred to the secondary winding where capacitor 20 and resistor 24 is coupled across the secondary winding to develop DC output voltage $V_{OUT}$. Diode 22 prevents current flow back into the secondary winding. Regulator circuit 82 provides a constant regulated output voltage $V_{OUT}$ to switching power supply 80 using feedback information from the secondary winding at resistor 24. The feedback information is fed-back to feedback circuit 28 which is then fed to regulator circuit 82 to turn ON and OFF power transistor 18 to control the power transfer across transformer 16.

Regulator circuit 82 includes power transistor 18, which is typically a Metal Oxide Semiconductor Field Effect Transistor (MOSFET) or an Insulated Gate Bipolar Transistor (IGBT). Power transistor 18 has a drain, source, and a gate. Connected to the gate of power transistor 18, i.e. gate 30, is transistor 40 and transistor 42 both connected to the node of gate voltage $V_G$ of power transistor 18. Transistor 40 is an n-type transistor with its drain connected to the node at gate voltage $V_G$, its source coupled to ground, and a control terminal for receiving control signal $L_C$. Transistor 42 has its source connected to the drain of transistor 40 at the node of gate voltage $V_G$, a voltage source $V_S$ connected to its drain, and a control terminal for receiving control signal $U_C$. Transistor 42 is a p-type transistor. Transistor 40 and transistor 42 are typically MOSFET transistors connected in a totem-pole configuration to drive power transistor 18. Voltage source $V_S$ is a low-impedance voltage source providing a reference voltage to the drain of transistor 42 of approximately 0 or 10 volts.

To operate switching power supply 80 in DCM mode of operation requires a way to detect when transformer 16 is demagnetized. To detect when transformer 16 of switching power supply 80 is demagnetized requires to detect a rise in current through power transistor 18. The source of power transistor 18 is monitored to detect the rise in current flow. A rise in current flow through power transistor 18 is detected as a voltage change at point P above resistor 50. The point P is coupled to the negative terminal of comparator 86, and is compared to voltage threshold $V_{TH}$ at the positive terminal of comparator 86. Voltage threshold $V_{TH}$ is a negative voltage of typically −0.2 volts. Comparator 86 provides demagnetization (DEMAG) signal to PWM regulator 46 when the level to its negative terminal from point P exceeds voltage threshold $V_{TH}$ set on the positive terminal. PWM regulator 46 receives DEMAG signal and enables control signals $U_C$ and $L_C$ to switch ON and OFF transistor 40 and transistor 42 in the timing sequence of the timing diagrams shown in FIG. 3.

PWM regulator 46 further receives feedback signal $F_B$ from feedback circuit 28. Feedback circuit 28 is a typical feedback circuit used in the prior art for switching power supplies. An example of feedback circuit 28 is an optical coupler circuit using a light emitting diode and photo-detection transistor. Feedback circuit 28 is connected to the output of switching power supply 80 at resistor 24 and provides feedback signal $F_B$ to PWM regulator 46. PWM regulator 46 receives the feedback signal $F_B$ and DEMAG signal, and provides control signals $L_C$ and $U_C$ to transistor 40 and transistor 42 respectively. When a rise in current is detected in power transistor 18, comparator 86 provides DEMAG signal to PWM regulator 46. PWM regulator 46 receives feedback signal $F_B$ and the DEMAG signal, and provides control signals $L_C$ and $U_C$ to transistor 40 and transistor 42. The node at point P of power transistor 18 converts the current flow to a voltage level by resistor 50. The voltage level is fed to the negative terminal of comparator 86 and compared to voltage threshold $V_{TH}$ fed to the positive terminal of comparator 86. Comparator 86 provides DEMAG signal to PWM regulator 46 when the voltage level fed to the negative terminal exceeds voltage threshold $V_{TH}$ fed to the positive terminal. PWM regulator 46 receives DEMAG signal and provides control signals $L_C$ and $U_C$ to transistor 40 and transistor 42 respectively to enable power transistor 18 to operate in DCM mode by switching transistor 40 and transistor 42 ON and OFF at appropriate times during a cycle. The timing of the switching of transistor 40 and transistor 42 is identical to the timing illustrated in FIG. 3. The important distinct difference from the embodiment shown in FIG. 1 is that DEMAG signal is derived from an increase in current through power transistor 18. The previous embodiment in FIG. 1 derived DEMAG signal by detecting the spike in voltage at gate 30 of power transistor 18. Feedback signal $F_B$ from feedback circuit 28 provides output voltage variation information to PWM regulator 46 to regulate output voltage $V_{OUT}$.

One shot circuit 48 is connected to the node at gate voltage $V_G$. One shot circuit 48 provides an enable (EN) signal to comparator 86 to enable comparator 86 after time delay $t_d$ to avoid false detection of demagnetization. False triggering of detection in comparator 86 may be caused by the primary to secondary leakage inductance of transformer 16 which shows up as an overshoot in $V_{DS}$ to power transistor 18. The EN signal from one shot circuit 48 further provides information to PWM regulator 46 and to control signal $L_C$ which controls transistor 40. Resistor 50 is connected to the source of power transistor 18 to monitor the source current in power transistor 18 and provide current sense CS to PWM regulator 46.

In addition to the embodiment in FIG. 4, regulator circuit 82 can detect when transformer 16 is demagnetized by sensing current through transistor 40 similar to using power transistor 18. To detect the point of demagnetization in transformer 16 using transistor 40, a current detector is coupled to the source of transistor 40 with an output coupled to a first terminal of comparator 86, and voltage threshold $V_{TH}$ coupled to a second terminal. Further, at time $t_3$ transistor 40 (S2) is kept switched ON after $t_D$ has expired. EN signal does not enable transistor 40 (S2) to switch OFF at time $t_3$ as the previous two embodiments disclose. Since transistor 40 is kept ON, at time $t_4$ the voltage spike in gate voltage $V_G$ is detected as a rise in conduction current through transistor 40. The rise in conduction current is fed to the first terminal of comparator 86, where comparator 86 provides DEMAG signal when the rise in conduction current, a voltage representation thereof, exceeds voltage threshold $V_{TH}$. The remaining regulator circuit to detect demagnetization using transistor 40 is similar to regulator circuit 82 which uses power transistor 18 to detect demagnetization in transformer 16.

The embodiments described herein are illustrated with current-mode architectures but can also be implemented with voltage-mode topologies and is not a limitation to the invention disclosed. A regulator circuit and method is disclosed which allows a switched-mode power supply to detect when the transformer of the switched-mode power supply is demagnetized. When the transformer is demagnetized, a power transistor is enabled ON to restart the previous cycle. Enabling ON the power transistor only after the transformer is demagnetized operates a switched-mode power supply in a discontinuous conduction mode (DCM). Detecting when the transformer is demagnetized without an auxiliary winding provides an advantage over the prior art. The regulator circuit of the present embodiment operates in DCM by detecting the state of demagnetization of a transformer in the switched-mode power supply by monitoring an increase in power transistor current, a rise in current through a transistor, or a rise in negative voltage at the gate to the power transistor. The described embodiment eliminates the auxiliary winding typically used to operate switched-mode power supplies in DCM.

What is claimed is:

1. A voltage regulator comprising:
    a switching transistor that switches a coil current in response to a switching signal received at a first node;
    a sense circuit coupled to the first node for sensing the coil current and producing the switching signal when the coil current falls below a threshold value for a time period; and
    a pulse circuit having an input coupled to the first node for initiating a pulse that terminates after the time period to enable the sense circuit.

2. The voltage regulator of claim 1 wherein the sense circuit includes a comparator for comparing the sense voltage to a reference voltage operating at the threshold value, the voltage regulator further comprising a resistor coupled at a second node to a conduction electrode of the switching transistor to develop a sense voltage with the coil current.

3. The voltage regulator of claim 2 wherein the sense circuit comprises a pulse width modulator regulator having a first input coupled to an output of the comparator, a second input coupled to the second node, and a first output coupled to the first node.

4. The voltage regulator of claim 3 wherein the pulse circuit has an output coupled to the pulse width modulator regulator and the comparator for providing the pulse.

5. The voltage regulator of claim 4 further comprising:
    a first transistor having a first conduction electrode coupled to receive a supply voltage, a second conduction electrode coupled to the first node and a control electrode coupled to the first output of the pulse width modulator regulator;
    a second transistor having a first conduction electrode coupled to the first node, a second conduction electrode coupled to a ground and a control electrode coupled to a second output of the pulse width modulator regulator.

6. The voltage regulator of claim 2 wherein a first input of the comparator is coupled to the second input of the pulse width modulator regulator.

7. The voltage regulator of claim 1 wherein the pulse circuit comprises a one shot circuit having an output for providing the pulse to establish the time period.

8. A method of regulating a voltage comprising;
    switching a coil current in response to a switching signal;
    applying the switching signal to initiate a pulse that terminates after a time period; and
    sensing the coil current to produce the switching signal when the coil current falls below a threshold value after the time period.

9. The method of claim 8, wherein the pulse delays the switching signal.

10. The method of claim 8, further including the step of applying the switching signal to a control terminal of a first transistor and the control terminal of a second transistor.

11. The method of claim 10, wherein the step of switching includes the step of switching the coil current through a third transistor.

12. The method of claim 11, wherein the step of applying includes the step of coupling the switching signal from the control terminals of the first and second transistors to a control electrode of the third transistor.

13. The method of claim 8, wherein the step of sensing includes the step of applying the coil current and the threshold value to a comparator.

14. The method of claim 13, wherein the step of applying includes the steps of:
    activating a one shot circuit to initiate the pulse; and
    activating a comparator after the pulse terminates.

* * * * *